United States Patent
Yamaguchi

(10) Patent No.: US 7,200,270 B2
(45) Date of Patent: Apr. 3, 2007

(54) PATTERN RECOGNITION APPARATUS AND METHOD USING DISTRIBUTED MODEL REPRESENTATION OF PARTIAL IMAGES

(75) Inventor: Osamu Yamaguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 10/316,097

(22) Filed: Dec. 11, 2002

(65) Prior Publication Data

US 2003/0128876 A1    Jul. 10, 2003

(30) Foreign Application Priority Data

Dec. 13, 2001   (JP)   ............................. 2001-380676

(51) Int. Cl.
*G06K 9/62*   (2006.01)
(52) U.S. Cl. ..................................... 382/224
(58) Field of Classification Search ................ 382/224
See application file for complete search history.

(56) References Cited

U.S. PATENT DOCUMENTS

| | | | | |
|---|---|---|---|---|
| 5,073,962 | A * | 12/1991 | Califano | 382/205 |
| 5,668,897 | A * | 9/1997 | Stolfo | 382/283 |
| 5,982,912 | A | 11/1999 | Fukui et al. | |
| 6,404,923 | B1 * | 6/2002 | Chaddha | 382/224 |
| 6,421,463 | B1 * | 7/2002 | Poggio et al. | 382/224 |
| 6,556,723 | B2 * | 4/2003 | Craver et al. | 382/294 |
| 6,690,819 | B1 * | 2/2004 | Teraji | 382/147 |
| 2001/0026634 | A1 * | 10/2001 | Yamaguchi | 382/118 |

FOREIGN PATENT DOCUMENTS

JP    2002-183732    6/2002

OTHER PUBLICATIONS

Procter, S., J. Illingworth. "ForeSight: Fast Object Recognition using Geometric Hashing with Edge-Triple Features". International Conference on Image Processing (Oct. 26-29, 1997). vol. 1. pp. 889-892.*
Yehezkel Lamdan, et al., "A General and Efficient Model-Based Recognition Scheme", IEEE, 1988, pp. 238-249.

* cited by examiner

*Primary Examiner*—Bhavesh M. Mehta
*Assistant Examiner*—Damon Conover
(74) *Attorney, Agent, or Firm*—Oblon, Spivak, McClelland, Maier & Neustadt, P.C.

(57) ABSTRACT

Pattern recognition apparatus and method for recognizing a recognition object by comparing with pre-registered models. From an inputted image, multiple feature points are extracted; therefrom, combination of multiple feature points is selected; and from the multiple selected feature points, bases which represent the positions and positional relations of these feature points are calculated. A partial pattern of the recognition object corresponding to each of the calculated bases is extracted from the image; and a search place on the table is decided based on an invariant parameter to geometric transformation of the partial pattern. The similarity between the partial pattern of the model registered in the search place on the table and the partial pattern of the recognition object is judged; and a plurality of hypothesis information showing that the recognition object exists in the image is generated based on the similarity between both partial patterns. The identification, position etc are decided based on the information.

11 Claims, 12 Drawing Sheets

FIG. 2
201
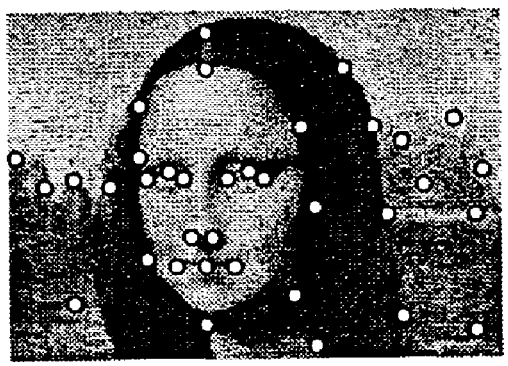
202
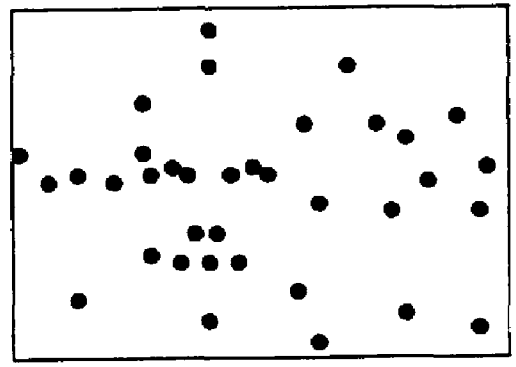
203

FIG. 5
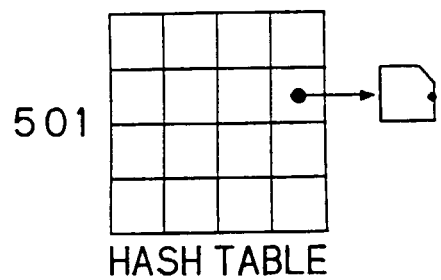
501 HASH TABLE
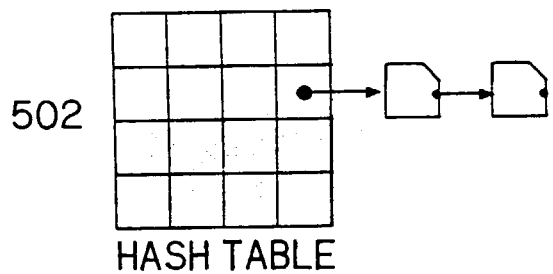
502 HASH TABLE
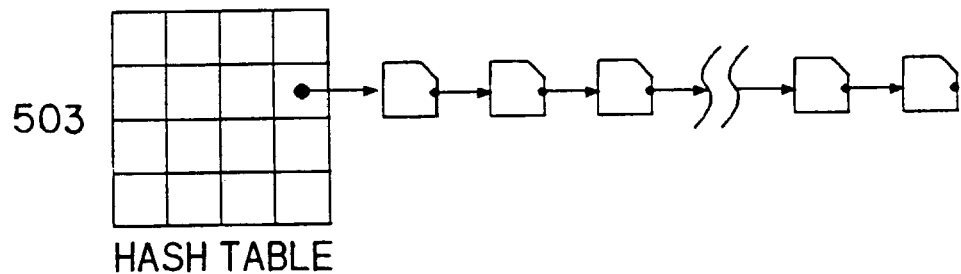
503 HASH TABLE
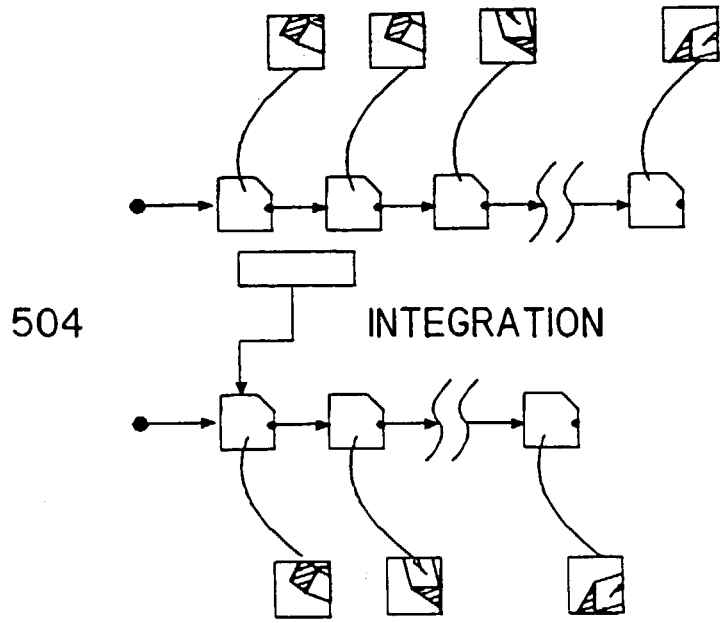
504 INTEGRATION FIG. 11
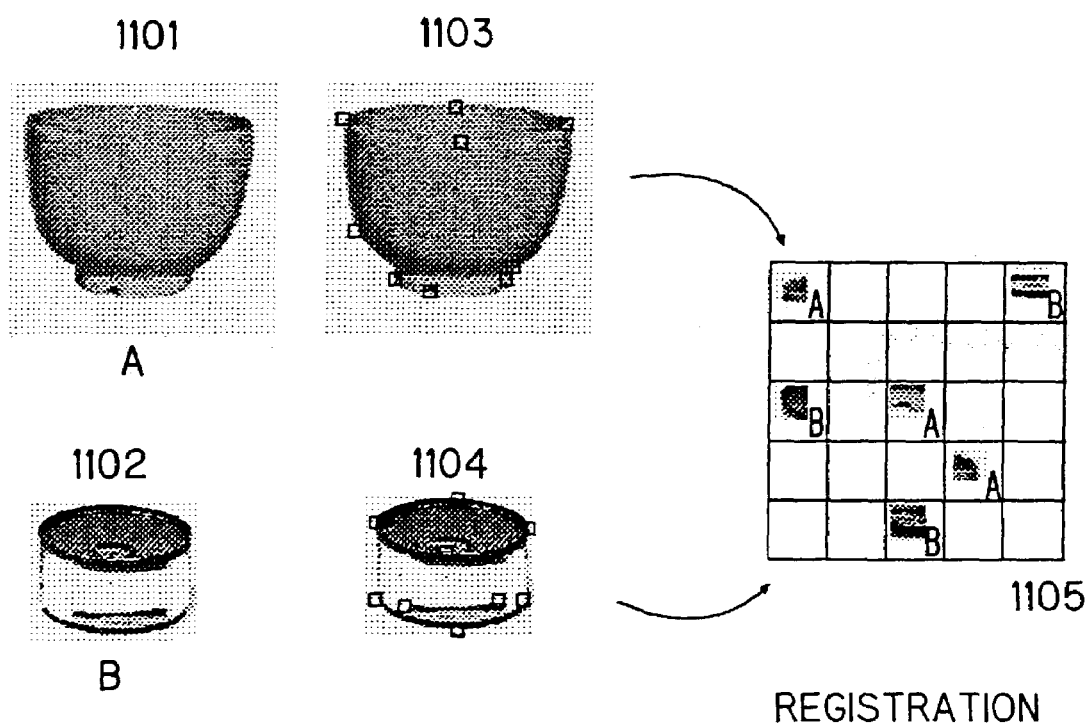
REGISTRATION
RECOGNITION
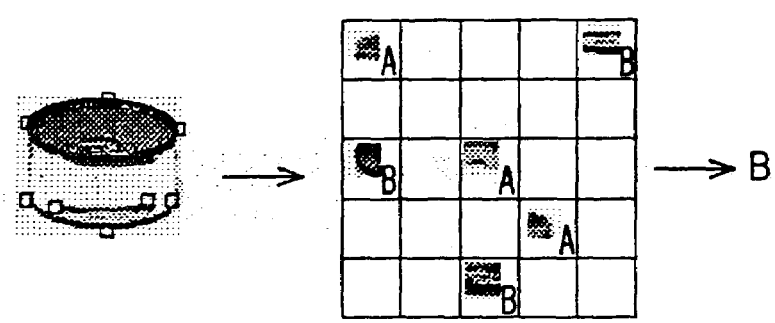

PATTERN RECOGNITION APPARATUS AND METHOD USING DISTRIBUTED MODEL REPRESENTATION OF PARTIAL IMAGES

BACKGROUND OF THE INVENTION

This invention relates to a pattern recognition method.

A technique for detecting and recognizing the position, orientation and shape of a specific object from an image is important for computer vision. Conventionally, various methods for correctly detecting the position and size of an object from an image with complicated background have been considered (see L. G. Brown, "A Survey of Image Registration Techniques," ACM Computing Surveys, Vol.24, No.4, pp.325–376).

As a feature-based object detection method among those methods, a geometric hashing method is proposed (see Lamdan, Y. and Wolfson, H. J., "Geometric Hashing: a General and Efficient Model-Based Recognition Scheme," Proceeding of International Conference Computer Vision, pp.238–249, 1988).

In this geometric hashing method, a geometric object is represented by a set of feature points and a model is described using invariant structural representation for translation, scaling and rotation. Then, the object is detected by hypothesis voting and majority rule for the object model, which is similar to Hough transformation (see P. V. C. Hough, "Method and Means for Recognizing Complex Patterns," U.S. Pat. No. 3,069,654,1962.) In this method, identification and detection of the object can be carried out simultaneously.

Hashing is the name of an algorithm which adds indexing based on a hash function in order to carry out high-speed search for multiple search objects, thereby efficiently dispersing the search objects on a memory and enabling high-speed access to the objects.

On the other hand, several methods based on template matching of intensity change information are proposed as appearance-based approaches (see H. A. Rowley, S. Baluja, and T. Kanade, "Rotational Invariant Neural Network-Based Face Detection," in Proceedings, IEEE Conference on Computer Vision and Pattern Recognition, pp.38–44, 1998).

Of these methods, matching based on intensity change information uses global information of a whole pattern and therefore is robust against noise.

Various extensions have been made to the geometric hashing method. Although the geometric hashing method is suitable for for detecting geometrically represented objects, it is difficult to detect objects with texture, for example, complicated objects with intensity change information such as eye, nose and mouth parts and shadows on the cheek as in a face shown in FIG. 2-201.

For example, a case will now be considered in which feature point detection as shown in FIG. 2-202 and detection from a set of feature points shown in FIG. 2-203 are carried out. In this case, it is difficult to represent a facial model only by a set of points; and the number of redundant candidate points increases on the complicated background; thus causing errors.

Also the appearance-based approaches, as can be seen from the example of face detection of Rowley et al, requires; multiplexing of model representation such as preparation of multiple templates that have been rotated in advance; and a plurality of time of matching or template matching for several stages of pyramidal images. That is, multiple templates must be provided for a plurality of modifications or transformations. The appearance-based approaches are robust in global evaluation of pattern similarity but are ineffective for discovery of partial distortions and local noise. Meanwhile, there is a method which uses false recognition patterns to improve the detection accuracy, as is carried out in the conventional face region detection methods. This also leaves a problem about how false recognition patterns can be collected.

Requirements for improving these conventional detection methods include the following:

i) registration of partial information and multiple description of models;

ii) a model description method based on invariant in order not to prescribe the orientation; and iii) a robust detection mechanism against noise.

BRIEF SUMMARY OF THE INVENTION

Thus, to meet these requirements, it is intended to carry out high-speed, correct and accurate object recognition and object detection by distributed model representation of partial images using a hash table and efficient pattern search.

According to a first aspect of the present invention, there is provided a pattern recognition apparatus for comparing an image which captured a recognition object with a pre-registered model and thus recognizing said recognition object, the apparatus comprising: image input means for inputting an image which captured said recognition object; feature point extraction means for extracting multiple feature points from said inputted image; feature point selection means for selecting a combination of multiple feature points from said extracted feature points; basis calculation means for calculating, from said multiple selected feature points, bases which represent the positions and positional relations of these feature points; partial pattern extraction means for extracting from said image a partial pattern of said recognition object corresponding to each of said calculated bases; table storage means for storing a table which includes a plurality of registration places divided based on index parameters including at least an invariant parameter to geometric transformation and on which a partial pattern of said model is registered in a registration place corresponding to an index parameter related to the partial pattern; index search means for deciding a registration place on the said stored table based on an index parameter corresponding to the partial pattern of said extracted recognition object; and pattern similarity calculation means for judging the similarity between the partial pattern of said model registered in said decided registration place on the table and the partial pattern of said recognition object.

According to a second aspect of the present invention, there is provided a pattern recognition method for comparing an image which captured a recognition object with a pre-registered model and thus recognizing said recognition object, the method comprising: inputting an image which captured said recognition object; extracting multiple feature points from said inputted image; selecting a combination of multiple feature points from said extracted feature points; calculating bases which represent the positions and positional relations of these feature points from said multiple selected feature points; extracting from said image a partial pattern of said recognition object corresponding to each of said calculated bases; deciding, on a table which includes a plurality of registration places divided based on index parameters including at least an invariant parameter to geometric transformation and on which a partial pattern of said model is registered in a registration place corresponding to an index parameter related to the partial pattern, said registration place based on an index parameter corresponding to the partial pattern of said extracted recognition object; and judging the similarity between the partial pattern of said model registered in said decided registration place on the table and the partial pattern of said recognition object.

According to a third aspect of the present invention, there is provided a program for realizing, by a computer, a pattern recognition method for comparing an image which captured a recognition object with a pre-registered model and thus recognizing said recognition object, the program realizing: an image input function for inputting an image which captured said recognition object; a feature point extraction function for extracting multiple feature points from said inputted image; a feature point selection function for selecting a combination of multiple feature points from said extracted feature points; a basis calculation function for calculating bases which represent the positions and positional relations of these feature points from said multiple selected feature points; a partial pattern extraction function for extracting from said image a partial pattern of said recognition object corresponding to each of said calculated bases; an index search function for deciding, on a table which includes a plurality of registration places divided based on index parameters including at least an invariant parameter to geometric transformation and on which a partial pattern of said model is registered in a registration place corresponding to an index parameter related to the partial pattern, said registration place based on an index parameter corresponding to the partial pattern of said extracted recognition object; and a pattern similarity calculation function for judging the similarity between the partial pattern of said model registered in said decided registration place on the table and the partial pattern of said recognition object.

The present invention enables distributed model representation based on partial patterns using a hash table and efficient pattern search.

The present invention also enables high-speed search of partial patterns, detection of correct position and orientation of an object and identification of an object using multiple search results.

The present invention also enables stable detection and identification of an object containing noise and hidden parts.

Moreover, the present invention enables efficient saving of models by table registration means, reducing the search time.

BRIEF DESCRIPTION OF THE DRAWINGS

FIG. 2 shows images each on which feature point extraction processing has been performed.

FIG. 5 shows a processing method related to model collision.

FIG. 11 shows identification of a recognition object.

DETAILED DESCRIPTION OF THE INVENTION

First Embodiment

Hereinafter, a pattern recognition apparatus according to a first embodiment of the present invention will be described with reference to the drawings.

Figure 4:
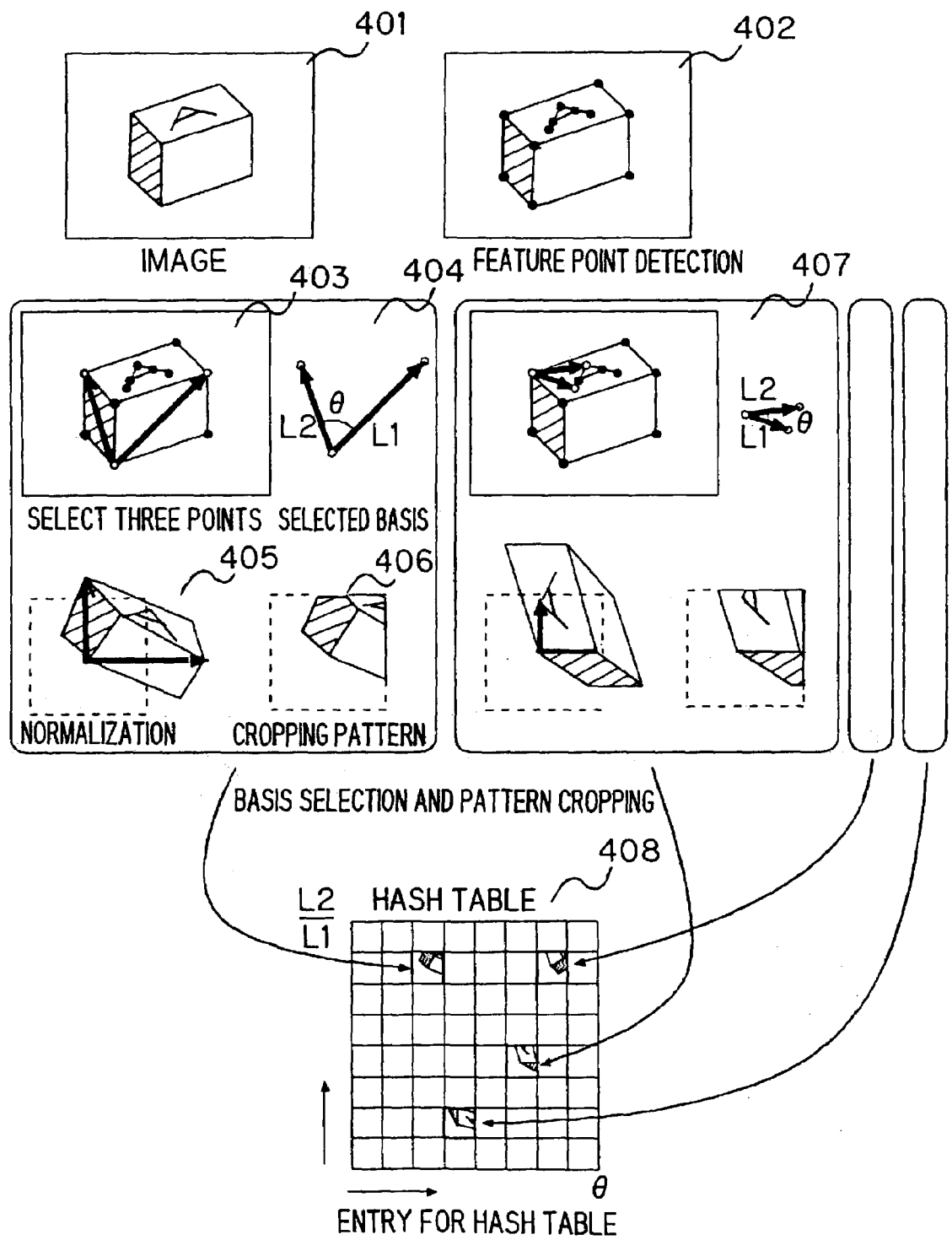
FIG. 4 shows a model registration method.

This embodiment is a method for detecting the position and orientation of an object of interest from a certain image. An object for recognition object may be of any kind. In the present embodiment, a case will be described in which the object is a rectangular-parallelepiped box having a pattern, which is a letter "A" appearing on its one side, as shown in FIG. 4-401.

In this embodiment, an image obtained by capturing this box at an arbitrary position and an arbitrary orientation is used as one model; and images of the box at various positions and orientations are registered as multiple models.

Then, which model is similar to a detection object image which captured the same box is judged; and the position and orientation of the box of the detection object image are recognized.

Thus, the following description is divided into two sections, that is, "model registration" and "model detection and identification based on voting".

(1) Structure of Pattern Recognition Apparatus

Figure 1:
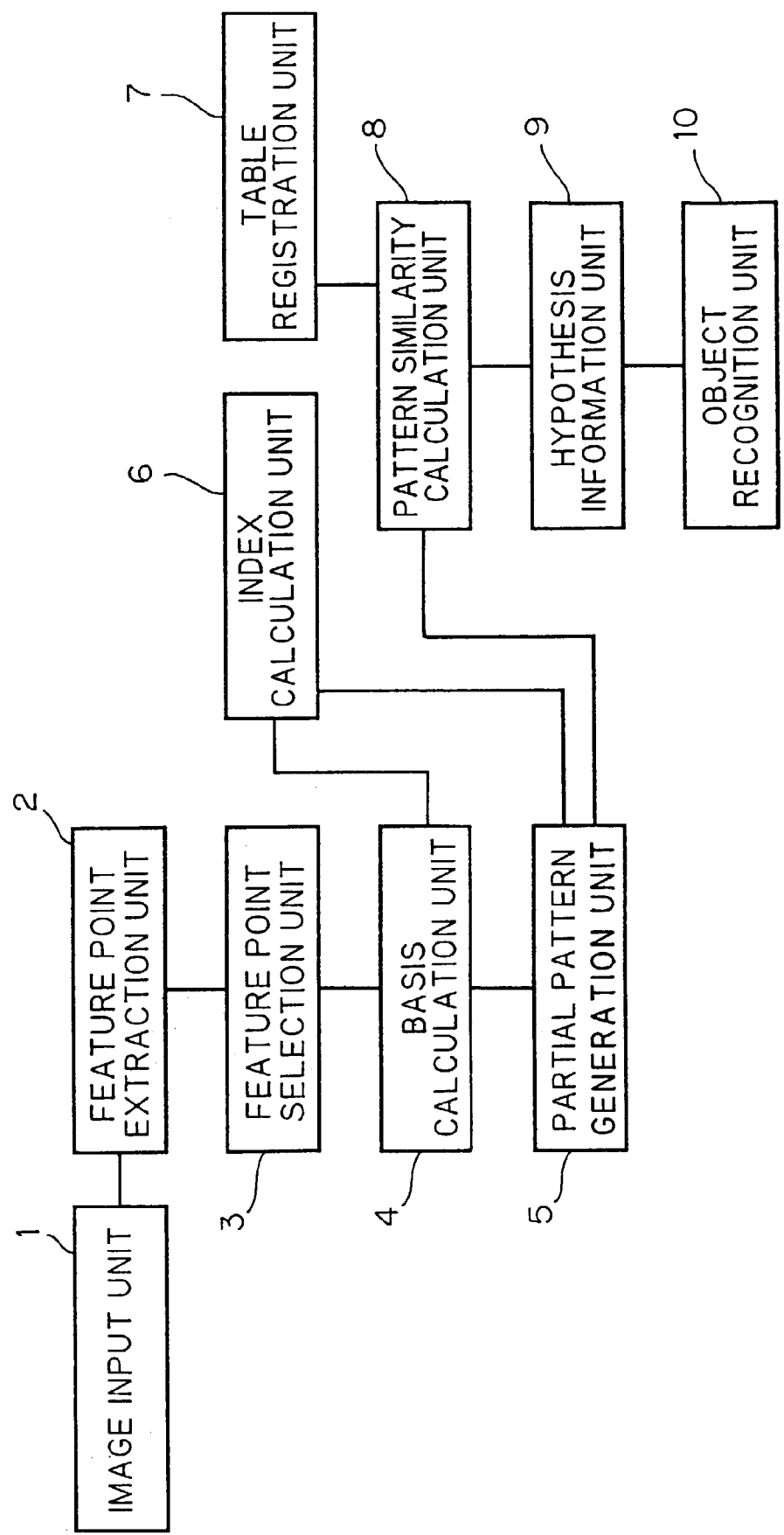
FIG. 1 is a structural view of an object recognition apparatus according to a first embodiment of the present invention.

FIG. 1 is a structural view of the pattern recognition apparatus of this embodiment.

As shown in FIG. 1, the pattern recognition apparatus is constituted by an image input unit 1, a feature point extraction unit 2, a feature point selection unit 3, a basis calculation unit 4, a partial pattern generation unit 5, an index calculation unit 6, a table registration unit 7, a pattern similarity calculation unit 8, a hypothesis information generation unit 9, and an object recognition unit 10.

Of these, the image input unit 1 is made up of a CCD camera or the like, and the functions of the other units, that is, the feature point extraction unit 2, the feature point selection unit 3, the basis calculation unit 4, the partial pattern generation unit 5, the index calculation unit 6, the table registration unit 7, the pattern similarity calculation unit 8, the hypothesis information generation unit 9, and the object recognition unit 10 are realized by programs stored in a computer such as a personal computer.

(2) Model Registration

A model registration method for a recognition object will be described with reference to FIGS. 1, 3 and 4.

(2-1) Flow of Model Registration Processing

The flow of processing will be described with reference to the flowchart of FIG. 3.

Figure 3:
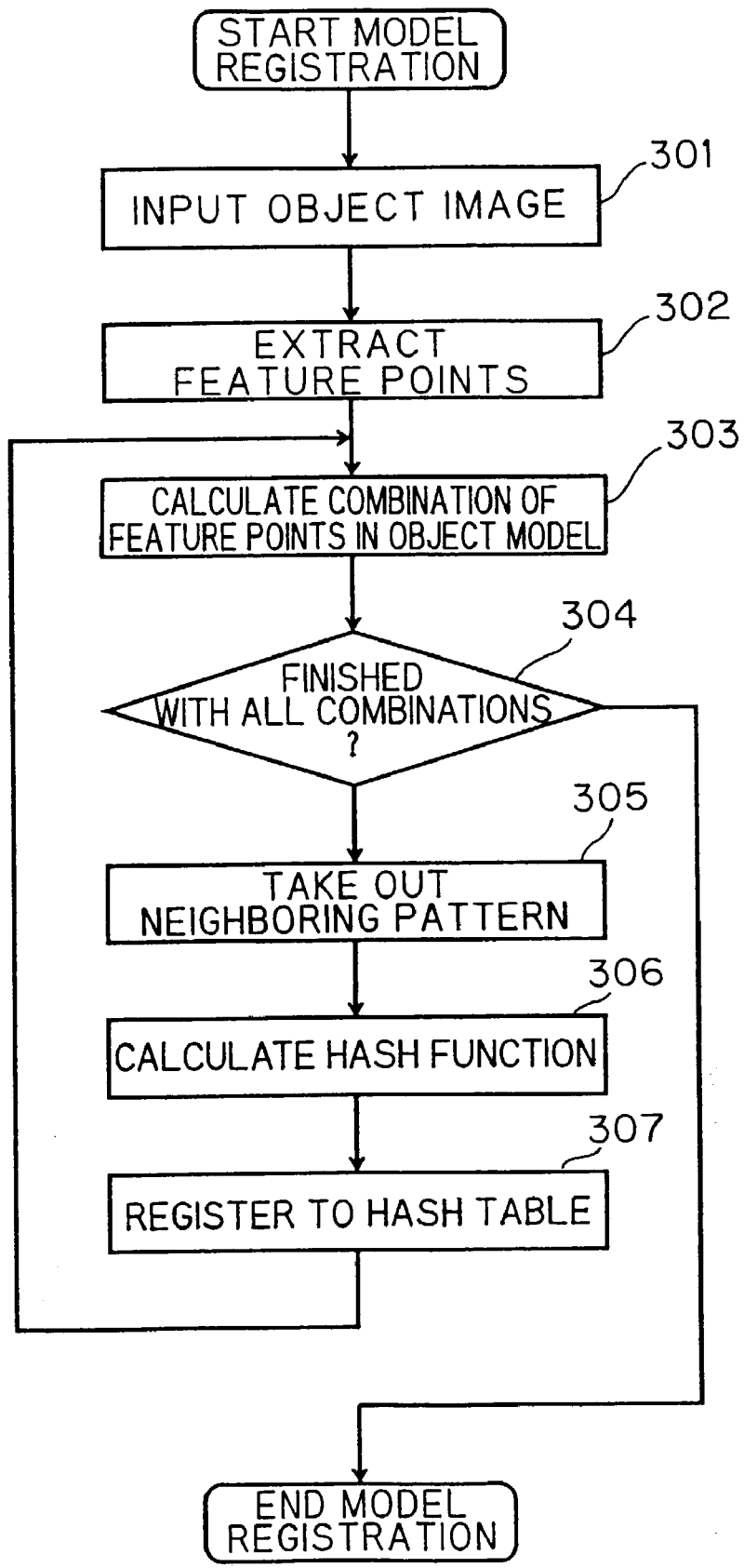
FIG. 3 is a flowchart of model registration stage.

First, an image including a recognition object is inputted at the image input unit 1 of FIG. 1 (step 301 of FIG. 3).

Next, extraction of feature points is carried out on the image, at the feature point extraction unit 2 (step 302 of FIG. 3).

A technique for this feature point extraction may use a separability filter proposed by K. Fukui and O. Yamaguchi, "Facial feature point extraction method based on combination of shape information and pattern matching,"

Systems and Computers in Japan, vol. 29(6) pp. 49–58, (1998). A filter like a Harris filter for detecting a corner may also be used; See C. J. Harris and M. Stephens, "A combined corner and edge detector," in Proc. 4th Alvey Vision Conference, Manchester, pages 147–151, 1988. A suitable technique may be selected in accordance with the purpose and object to be recognized (recognition object).

Next, at the feature point selection unit 3, feature points that are in a part including the recognition object are selected; and all three-point combinations are found out among the feature points (step 303 of FIG. 3).

Then, registration of a partial pattern is carried out for each of the combinations. Two vectors are decided from each combination of three points, at the basis calculation unit 4; and partial intensity change pattern in a neighboring region is taken out, using basis information based on the two vectors, at the partial pattern generation unit 5 (step 305 of FIG. 3).

For each partial intensity change pattern thus taken out, a registration place is calculated using a hash function at the index calculation unit 6 (step 306 of FIG. 3); and the partial intensity change pattern is registered to a hash table managed by the table registration unit 7 (step 307 of FIG. 3).

This procedure is repeated, and when all the combinations are found, registration of one model is completed (step 304 of FIG. 3).

In the case of registering multiple models, the foregoing processing is repeated.

(2-2) Concrete Example of Model Registration

Model registration of the image of FIG. 4-401 obtained by capturing the box as a model object will now be described.

The result of extracting feature points of the box as a model object is shown in FIG. 4-402.

Some principal points (hereinafter referred to as interest points) are selected in advance among these feature points; and all combinations of three interest points are found. These combinations of selected three points are called feature point groups.

FIG. 4-403 shows one feature point group of these feature point groups. Two basis vectors are found out from the three feature points.

FIG. 4-404 shows a basis formed by the two basis vectors. The lengths L1 and L2 of the two vectors and the angle θ between them are calculated.

A "basis" constitutes a coordinate system using several basis vectors and has information of origin and coordinate axes. Here, the starting point of the two basis vectors is used as the origin and the directions of the basis vectors are used as the direction of the coordinate axes. In the case of defining a feature point group formed by feature points F1, F2 and F3, it is considered that a group using the feature point F1 as the origin and a group using the feature point F2 as the origin are different groups.

Next, on that basis, an image pattern on the neighboring region of the origin and the two basis vectors is taken out (FIG. 4-405). In this occasion, the coordinate system of the basis formed by the two basis vectors is transformed to an orthogonal coordinate system and then the image pattern is taken out.

To take out the image, the coordinate system of the basis formed by the two basis vectors is transformed to an orthogonal coordinate system. That is, the whole image is modified so that the angle made by the basis vectors is a right angle while the two basis vectors have the same length.

After that, an intensity change image (m×n pixel image) within a predetermined range about the origin of the basis is taken out as a partial pattern.

The intensity change image thus taken out has an invariant format to various geometric transformations. By thus carrying out coordinate transformation of the intensity change image in advance and then performing registration and search, it is possible to judge similarity without carrying out any geometric transformation of the intensity change image when comparing patterns later.

FIG. 4-406 shows a partial intensity change image that is taken out. In this embodiment, a square intensity change image is shown.

The partial image that is taken out may appear to be distorted, depending on the lengths and directions of the basis vectors.

FIG. 4-407 shows the case where formation of a basis and taking out a partial pattern are similarly carried out using another combination of three points.

The partial patterns that are taken out are registered in a predetermined registration place on a table calculated by a hash function (hereinafter referred to as hash table). The contents of registration may also include the type of interest points, relative position information of partial patterns in the whole recognition object and so on, in addition to the partial intensity change image.

(2-3) Registration to Hash Table

The hash function has such a characteristic that it uses invariance to translation, rotation and scaling transformation with respect to a provided basis. In the case of bases having certain identical conditions, a function that returns the same return value is defined even though these transformations are performed thereon.

Since the angle between the two basis vectors forming the basis and the ratio between the lengths of the two vectors are invariant to geometric transformations such as translation, rotation and scaling, constitution of a hash function using this invariance is considered. That is, registration places on the hash table are decided for the angle between the two basis vectors and the ratio between the lengths of the two vectors, as parameters invariant to geometric transformations (hereinafter referred to as index parameters).

The hash function H provides three feature points p1, p2 and p3 as factors as follows, finds a ratio $R_{axs}$ of length and an angle $\theta_{axs}$ as index parameters, then carries out quantization, and returns positions on the hash table. The positions of P1, p2 and p3 are expressed with reference to the origin of an absolute coordinate system. The origin on the basis is the feature point p1.

$$H(p_1, p_2, p_3) = \{\theta_{axs}, R_{axs}\}$$

$$\theta_{axs} = \cos^{-1} \frac{(\vec{p}_2 - \vec{p}_1, \vec{p}_3 - \vec{p}_1)}{|L_1||L_2|}$$

$$R_{axs} = \frac{|L_2|}{|L_1|}$$

$$L_1 = \|\vec{p}_2 - \vec{p}_1\|$$

$$L_2 = \|\vec{p}_3 - \vec{p}_1\|$$

FIG. 4-408 shows a two-dimensional hash table. The vertical axis represents the ratio $R_{axs}$ between the lengths of the two basis vectors; and the horizontal axis represents the angle $\theta_{axs}$ formed by the two basis vectors.

The angle $\theta_{axs}$ between the two vectors found for each basis and the ratio $R_{axs}$ of their lengths are found; and at positions indicated by their values on the hash table, the partial intensity change pattern that is taken out and the like are registered.

Appropriate quantization may be performed on these $\theta_{axs}$, $R_{axs}$ in consideration of errors.

The entities registered on each hash table are expressed as follows. However, they are not limited to the following format and type.

(Axs, Label, Inv, Rel, SPat)

"Axs" represents coordinate system information based on the three feature points. Specifically, it includes information such as coordinate positions of three points and the two basis vectors.

Figure 7:
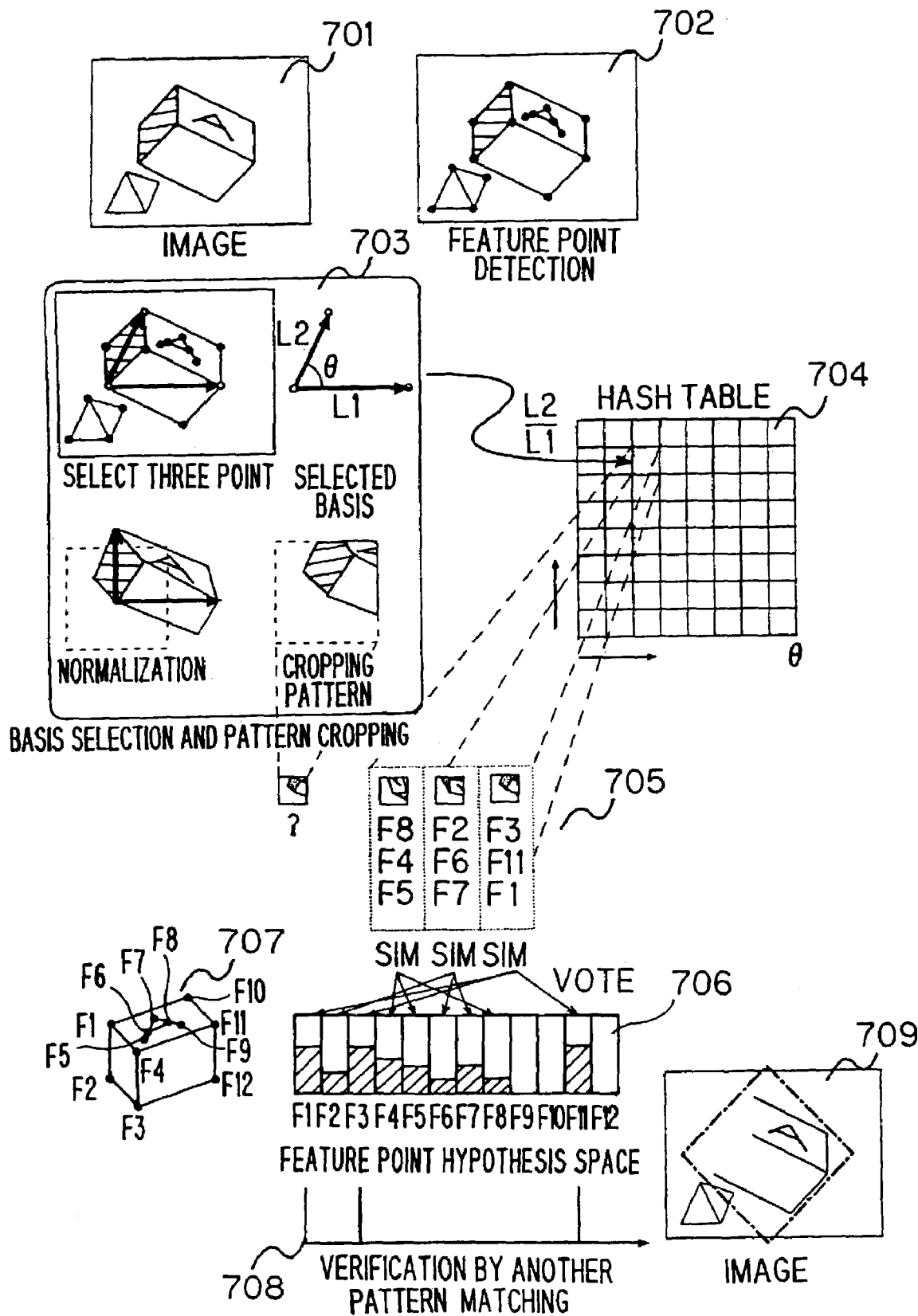
FIG. 7 shows a recognition method.

"Label" represents to which interest points the three feature points correspond. Specifically, labels (F1 to F12) are attached to the vertices as shown in FIG. 7-707; and labels to which the three points indicated by "Axs" correspond are described.

"Inv" represents the invariant to transformation. It includes the above-described $\theta_{axs}$, $R_{axs}$ and the like.

Figure 9:
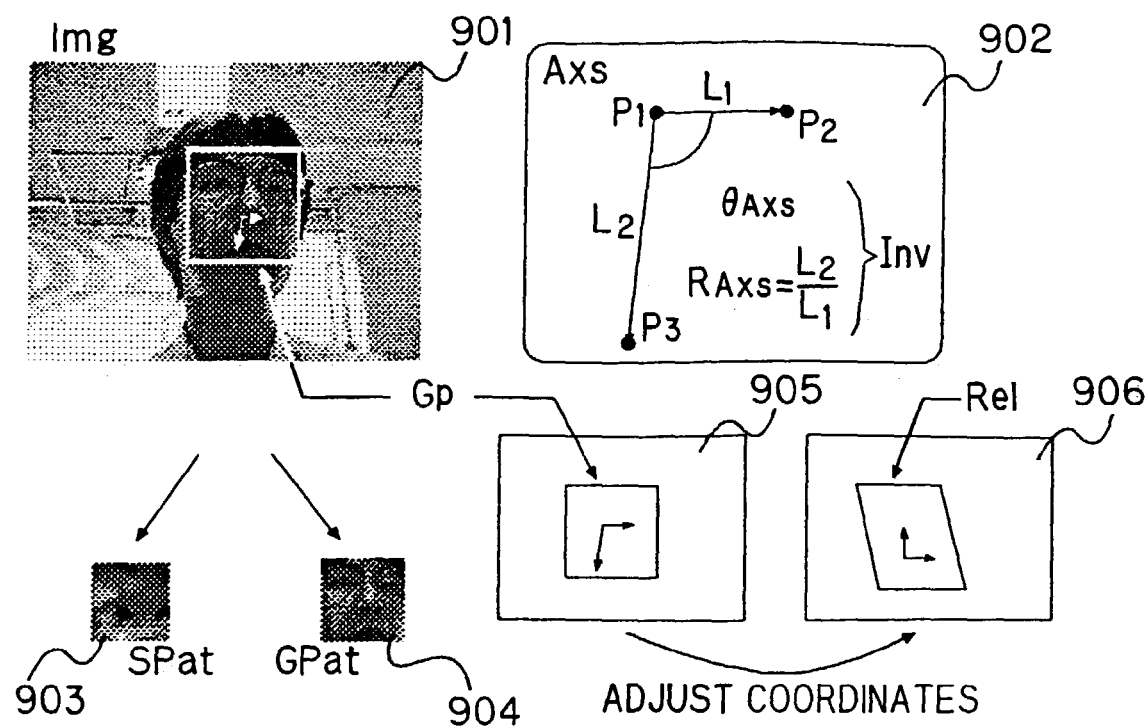
FIG. 9 shows various data related to partial pattern information.

"Rel" is a relative representation of a set of points, which represent a region surrounding the object. It is used for showing the place of detection results and for extracting the region again. Specifically, it is described with coordinate positions of four points of a set of vertices for representing a rectangle as shown in FIG. 9.

"SPat" represents a local image surrounded by the feature points, that is, the partial intensity change pattern that is taken out.

Similar processing is performed on all the combinations; and a model is registered.

The processing on one image is described above. By carrying out similar registration using other images, which are obtained by capturing the same recognition object under different conditions, it is possible to recognize the recognition object captured in various environments.

(2-4) Dealing with Collision in Hashing Algorithm

However, as such registration is sequentially carried out; if the same hash function value is provided by a combination of certain three points, that partial pattern will be registered to the same position. That is, a collision problem in the general hashing algorithm occurs.

At each position on the hash table, multiple candidate patterns can be connected and held in a list structure, as shown in FIG. 5-501. When a collision occurs, multiple new collation candidates are provided as shown in FIG. 5-502. This method is generally called chain method. If the number of collation candidates is increased, many candidates exist as shown in FIG. 5-503.

In the case where multiple models for the same recognition object are registered, the similarity of collation data patterns is judged; and models having high similarity may be merged as one model.

For example, when patterns meet the conditions of high similarity and the like, a new model pattern is prepared, so that patterns are merged into a single model pattern, as shown in FIG. 5-504. As a merging method, an average pattern of multiple models may be prepared. When merging multiple models, if an introduced average pattern is less similar to the original models, it may be separately handled as another model.

(3) Model Detection and Identification Based on Voting

A method for detecting a recognition object from an image will now be described.

To facilitate understanding of the detection algorithm for a recognition object, each of following stages will be explained separately—model selection using a hash table, generation hypotheses, and recognition based on integration and verification of hypotheses.

(3-1) Model Selection Using A Hash Table (3-1-1) Explanation of Model Selection Processing The flow of model selection processing using a hash table will be described with reference to FIG. 6.

Figure 6:
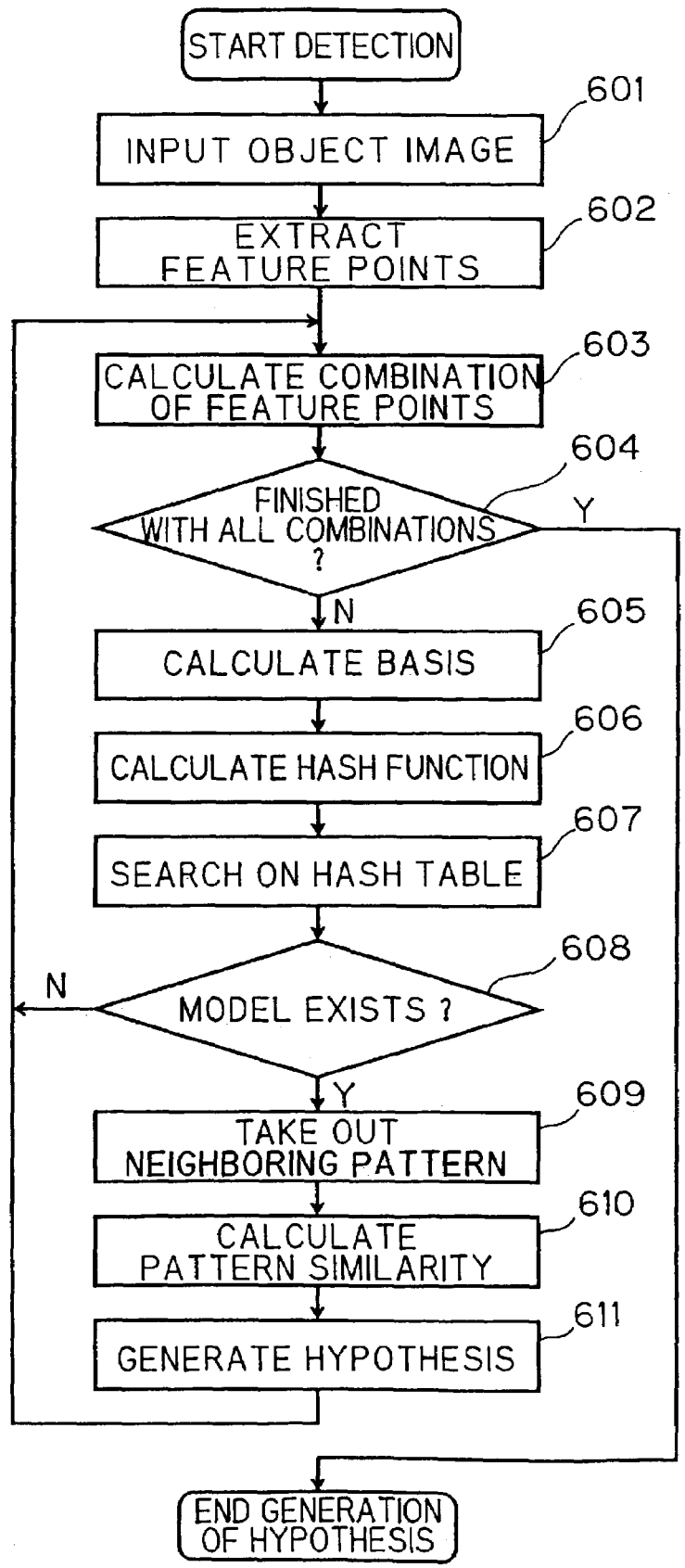
FIG. 6 is a flowchart (of generation of hypothesis information) of recognition stage.

First, an image as a recognition object is read into the image input unit 1 of FIG. 1 (step 601 of FIG. 6).

Next, feature points are extracted from the image taken as a recognition object, at the feature point extraction unit 2 (step 602 of FIG. 6).

Next, from the extracted feature points, a combination of extracted feature points is selected at the feature point selection unit 3 (step 603 of FIG. 6). This is sequentially carried out until all combinations are selected (step 604 of FIG. 6).

A basis for each combination is calculated at the basis calculation unit 4 (step 605 of FIG. 6).

Then, index parameters of a hash function on that basis are calculated at the index calculation unit 6 (step 606 of FIG. 6).

Search for registration places on the hash table to which the index parameters correspond is carried out at the table registration unit 7 (step 607 of FIG. 6).

The judgment of this differs, depending on whether a registration pattern exists or not (step 608 of FIG. 6).

If a registration pattern exists, a partial pattern on the neighboring region is taken out at the partial pattern generation unit 5, and the similarity between the registration pattern and the partial pattern is calculated and compared at the pattern similarity calculation unit 8. The method for calculating the similarity between patterns may be any general method for calculating the similarity of intensity change patterns; for example, normalized correlation, sum squired difference (SSD), simple similarity or the like. The method for calculating the similarity between patterns is not particularly limited.

If no registration pattern exists, there is no model and calculation of similarity is not carried out (step 608 of FIG. 6).

After model selection is carried out, if the partial pattern in the neighboring region based on the combination of three points is similar to the model, there is a possibility that the partial pattern is a part of the object region to be detected. Therefore, hypothesis information of the detection object region is generated at the hypothesis information generation unit 9. This procedure is carried out on all the combinations of detected feature points and the processing to generate hypothesis information is repeated. This processing will be described later.

(3-1-2) Concrete Example of Model Selection Processing

Above-described procedure will be specifically described with reference to FIG. 7.

The purpose of this processing is to detect the position and orientation of the box that is registered in the above-described model registration, based on the inputted image.

FIG. 7-701 shows the input image which captured the box as a recognition object. From this image, detection of feature points is carried out similarly to the model registration (FIG. 7-702).

Next, certain three points are selected from the feature points, similarly to the model registration.

In accordance with basis information prepared based on these three points, an intensity change pattern in a neighboring region is taken out (FIG. 7-703).

Next, a place on the hash table (FIG. 7-704) corresponding to the invariant of the basis information is searched for.

If a registration pattern exists and the similarity exceeds a preset threshold, a hypothesis is generated.

If there are three matching patterns as shown in FIG. 7-705, each hypotheses for the three patterns are generated.

(3-2) Generation of Hypothesis Information

The contents of hypothesis information include information of the places of feature points, information of position and size, intensity change pattern information, information of similarity to a model pattern, and so on. As an example, the hypothesis is defined by the following triplet. The definition of the hypothesis information is not limited to this.

(TRel, TLabel, Psim)

"TRel" represents position information obtained by transforming "Rel", which is relative position information, in accordance with the selected three points. It represents the region where the object exists in the image.

"TLabel" is for describing to which interest points the feature points correspond.

"Psim" represents the similarity between the intensity change pattern registered as a model and the selected partial pattern.

Pattern information decided from the three points selected at the time of detection is expressed as follows, similarly to the pattern information described on the hash table.

($Axs_x$, $\phi$, $Inv_x$, $Rel_x$, $SPat_x$)

$\phi$ represents an empty set. "$Label_x$" is $\phi$ because information of the interest points is not decided only by the selection of three points.

A partial model existing in a part having the same hash function value is expressed as follows.

($Axs_m$, $Label_m$, $Inv_m$, $Rel_m$, $SPat_m$)

That is, the results of search show the same place, $Inv_x = Inv_m$ holds. To generate hypothesis information, the elements are calculated by the following three functions.

TLabel=FuncLab ($Axs_m$, $Axs_x$, $Label_m$)
TRel=FuncGeom ($Axs_x$, $Rel_m$)
Psim=FuncSim ($SPat_m$, $SPat_x$)

"FuncLab" is a function for calculating the label of the corresponding interest point. "FuncLab" returns a label of Labclm corresponding to the order of $Axs_m$, as TLabel, to each point of $Axs_x$.

"FuncGeom" is a function for calculating the position at which the object exists, using the selected basis.

Specifically, it is calculated in accordance with the following equation, where (.,.) represents coordinate.

$Axs_x = \{(px_1, py_1), (px_2, py_2), (px_3, py_3), [A_u, A_v], [B_u, B_v]\}$ $[A_u, A_v]$ and $[B_u, B_v]$ represent two basis vectors and are constituted by three points $(px_1, py_1)$, $(px_2, py_2)$ and $(px_3, py_3)$.

$A_u=(px_2-px_1)$, $Av=(py_2-py_1)$
$B_u=(px_3-px_1)$, $B_v=(py_3-py_1)$

When $Rel_m = \{(rx_1, ry_1), (rx_2, ry_2), (rx_3, ry_3), (rx_4, ry_4)\}$ is expressed by four points representing a rectangle, TRel={$(px_1+rx_1A_u+ry_1B_u, py_1+rx_1A_v+ry_1B_v)$,
$(px_1+rX_2A_u+ry_2B_u, py_1+rx_2A_v+ry_2B_v)$,
$(px_1+rx_3A_u+ry_3B_u, py_1+rx_3A_v+ry_3B_v)$
$(px_1+rx_4A_u+ry_4B_u, py_1+rx_4A_v+ry_4B_v)$ "FuncSim" is a function for calculating the similarity between intensity change patterns. There are various methods for finding the similarity between patterns, as described above. For example, in the case of simple similarity, the following equation is used.

$SPat_m$ and $SPat_x$ represent $k=(m \times n)$-dimensional vectors. $SPat_m = \{im_1, im_2, im_3, \ldots, im_k\}$ $SPat_x = \{ix_1, ix_2, ix_3, \ldots, ix_k\}$ $Psim=(SPat_m, Spat_x)/\|SPat_m\|\|SPat_x\|$ $\|\|$ represents the norm of the vector.

Using the contents of the partial model registered to each hash table, the contents of each hypothesis are calculated. Although a threshold for the similarity Psim value is set in the above description, hypothesis information may be generated for all similarity values including low similarity values.

Since each hypothesis information has information indicating that it is a part of the detection object region, recognition of the object can be carried out by integrating the hypotheses.

(3-3) Recognition Based on Integration and Verification of Hypothesis Information Using the similarity of the partial pattern, hypothesis information indicating that it is a part of the detection object region is generated as described above. All the hypothesis information is voted to a hypothesis space and the results are integrated. This is processed at the object recognition unit 10.

In this embodiment, a detection method which enables specifying the places of the interest points set at the time of model registration will be described.

(3-3-1) Concrete Example of Hypothesis Voting Processing

The hypothesis space for voting the hypothesis information is managed by a hypothesis integration unit included in the object recognition unit 10. FIG. 7-706 graphically shows the hypothesis space. FIG. 7-707 shows the places of the interest points set at the time of model registration. The hypothesis space is constituted by hypothesis voting boxes that are respectively corresponding to the interest points.

As a hypothesis in the case where the three points shown in FIG. 7-703 are selected, it is considered that there are three points having pattern similarity exceeding the threshold, as shown in FIG. 7-705. Each hypothesis information describes which combination of interest points provides the hypothesis. For example, a combination of interest points F8, F4 and F5 is described.

At the hypothesis voting boxes each corresponding respectively to the interest points F1, F2, . . . , F12, voting is carried out by the pattern similarity value. That is, the similarity value represented by "Psim" is added to the hypothesis voting box described by "Label".

Normally, in the case of voting for the same interest point, it has multiple different feature points. In this case, with respect to different coordinate values, the voting value is managed for each coordinate at each hypothesis voting box. This is useful for detecting multiple objects or deleting erroneous detection contents.

In this manner, voting is carried out for all the hypothesis information related to all the combinations.

Next, from the combinations having high voting values, the coordinate values are outputted as detection results of the feature points, in the order from the highest value in the number of votes obtained (FIG. 7-708). These coordinate values are coordinate values of the feature points of the box that is picked up in the image of the recognition object.

For this procedure, the processing may be carried out in a following manner—set a certain threshold and output only those having values in the number of obtained votes equal to or higher than the preset value. In the example of FIG. 7, three feature points are selected and feature points designated as interest points are detected at these positions.

From the combination of selected feature points, the position of the whole pattern may be calculated and outputted (FIG. 7-709). In this case, the information of TRel representing the position where the object exists may be combined.

(3-3-2) Explanation of Hypothesis Voting Processing

Figure 8:
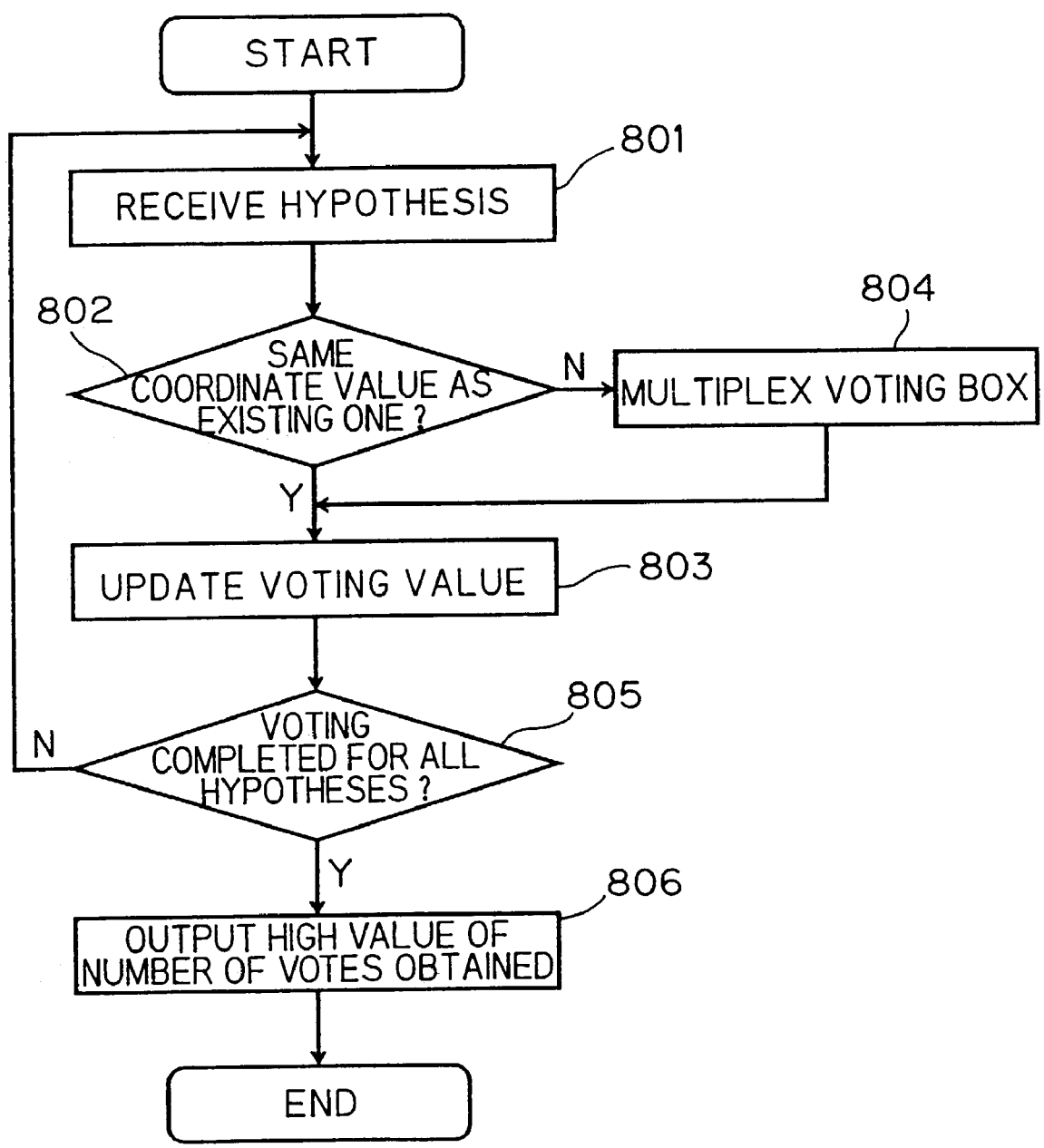
FIG. 8 is a flowchart of integration.

FIG. 8 is a flowchart showing the processing at the hypothesis integration unit.

As one hypothesis information is received at step 801 of FIG. 8, whether or not there already are interest points having the same coordinate value is examined, with respect to the type of interest points of three feature points constituting the hypothesis information (step 802 of FIG. 8).

If there are interest points having the same coordinate value, the similarity that is previously found is added to the voting value in the hypothesis voting box and the voting value is thus updated (step 803 of FIG. 8).

If there are no interest points having the same coordinate value, the resulting coordinate value differs. Therefore, another counter is prepared in the hypothesis voting box (step 804 of FIG. 8) and the similarity is added thereto to start updating. Whether or not voting for all the hypothesis information is completed is judged (step 805 of FIG. 8), and if not, voting for the hypothesis information is repeated.

If completed, from the voting values in the hypothesis voting boxes, those having high values in the number of obtained votes, are outputted as detection results. (step 806 of FIG. 8)

Second Embodiment

A second embodiment will now be described with reference to FIGS. 9 and 10.

In the second embodiment, a detection method which uses a pattern obtained by taking out an image of a global region in addition to a partial image will be described.

(1) Recognition Method Using Global Image for Face Region Detection

FIG. 9 shows various data in the recognition method using a global image for face region detection.

FIG. 9-901 shows an image including a face. Three feature points (nostrils and one lip corner) are selected as interest points; and a rectangle representing a region of a global image (whole face) is shown.

FIG. 9-902 shows a basis formed by the three points. The angle between vectors and the ratio between the lengths of the vectors are used as indexes of a hash table.

FIG. 9-903 shows an intensity change pattern on the neighboring region taken out in accordance with the basis formed by the three points.

In addition, an intensity change pattern of the whole face region is taken out as shown in FIG. 9-904. The contents of registration to the table in this case are expressed as follows.

(Axs, Label, Inv, Rel, SPat, GPat)

The global intensity change pattern GPat has been added to the contents of registration.

Moreover, using a coordinate system generated from the basis information, the representation of a rectangle showing the whole face region is changed from FIG. 9-905 to FIG. 9-906; and the relative coordinate Rel of each vertex is calculated. This is used for finding how the relative position of the global region will be, when detected.

In model registration stage, the partial pattern (FIG. 9-903) is registered in the foregoing method. In this method, the global pattern (FIG. 9-904) and the relative coordinate position of the global region shown in FIG. 9-906 are also registered in addition to the partial pattern.

In recognition stage, the partial pattern is similarly taken out, and at the same time, the global region must also be taken out. The relative coordinate position of the global region is calculated with respect to the selected basis information; and the coordinate position on the actual image is found. The intensity change pattern in that region is used as a global pattern candidate.

As a method for using the global pattern, the result of calculating the similarity between global patterns in addition to the similarity between partial patterns may be used in model search.

(2) Concrete Example of Face Recognition

Figure 10A:
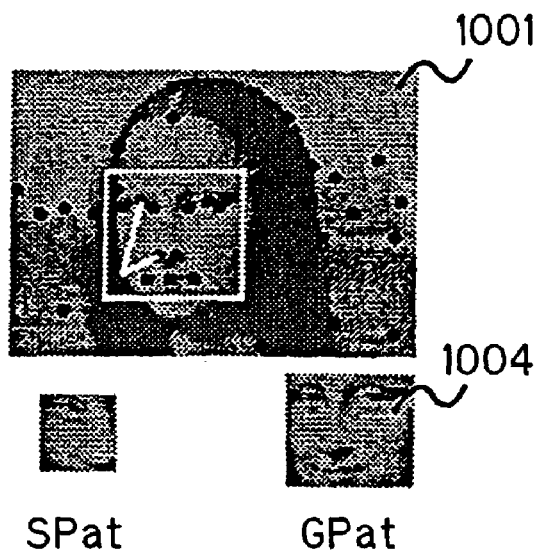
FIG. 10 shows the usage of global pattern information in a second embodiment.
Figure 10B:
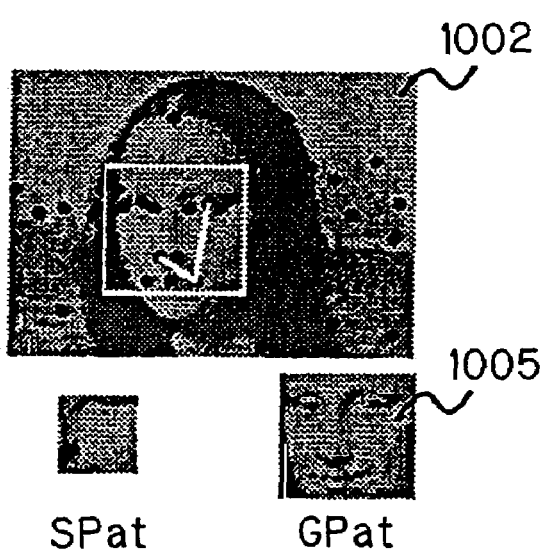
Figure 10C:
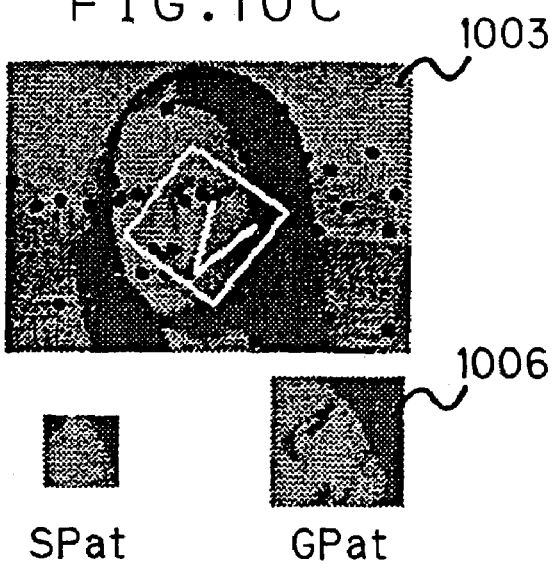

For example, in face recognition, FIG. 10A and FIG. 10B show that a basis is selected based on different hypothesis information (pictures 10-1001, 1002), and a partial pattern SPat and a global pattern GPat are taken out for each of FIG. 10A and FIG. 10B. In this case, to determine whether the two different hypotheses represent the same recognition object or not, global patterns indicated by the contents of detection can be compared with each other.

With respect to FIG. 10A and FIG. 10B, similar parts are taken out as global patterns (pictures 10-1004, 1005). In picture 10-1003 showing detection contents on FIG. 10C based on still another hypothesis information, a different global pattern is taken out as shown in picture 10-1006. By comparing this pattern with the patterns of pictures 10-1004 and 1005, it can be determined that this hypothesis information is not appropriate.

This can be used for verification of whether the same recognition object is handled or not, not by pattern comparison between a model and a recognition object but by pattern comparison between already registered hypothesis information.

Third Embodiment

A third embodiment will now be described.

In the third embodiment, identification of a recognition object is carried out.

If the orientation of a recognition object is prescribed to a certain extent, it is possible to identify the recognition object based on a model representation approach using a similar hash table.

For example, as shown in FIG. 11, feature extraction (FIG. 11-1103, 1104) is carried out with respect to an object A (FIG. 11-1101) and an object B (FIG. 11-1102); and partial patterns are taken out based on all the combinations of feature points and registered to a hash table. In this case, the names of the objects are also registered for "Label" in the registration stage (FIG. 11-1105).

In recognition stage, the foregoing similar procedures are followed and the names of the objects including voted feature points are outputted. Thus, identification of the recognition object is made possible, that is, what object exists can be known.

For example, in the case of recognition of a person, face data of several persons are registered to the table; and a person who acquired the highest value in the number of obtained votes can be used as the result of recognition, for that person to be recognized.

Fourth Embodiment

Another embodiment of recognition will now be described with reference to FIG. 12, in which multiple objects are recognized from an image and the names of the objects and regions where these objects exist are used as results.

Figure 12:
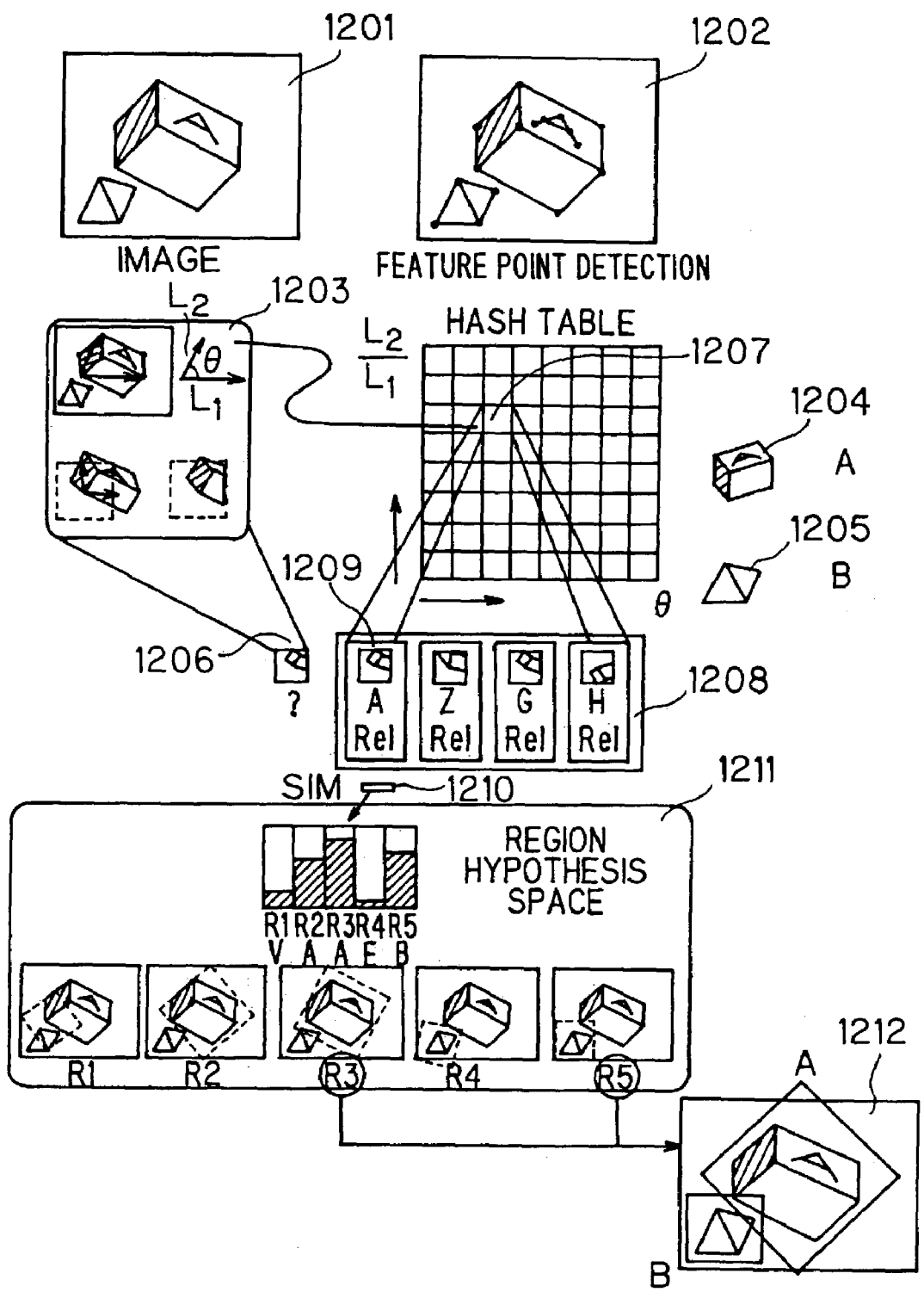
FIG. 12 shows explanatory of a fourth embodiment.

As shown in FIG. 12-1201, there are two objects A and B (FIGS. 12-1204, 1205) and their positions and names should be found. Several objects are registered in advance to a hash table and their names are identified by alphabets.

First, extraction of feature points is carried out on an input image (FIG. 12-1202), as in the foregoing embodiments.

Next, arbitrary three feature points are selected, and a basis and a partial pattern are calculated (FIG. 12-1203).

From the invariant calculated for the basis, a search position on a hash table (FIG. 12-1207) is decided and the partial pattern is compared with a model registered at that position.

In this embodiment, it is assumed that four models are registered there, as shown in FIG. 12-1208. These contents of registration describe partial patterns, labels of names indicating which objects, and sets of points Rel for representing the regions of existence when relatively represented.

Now, the four registration contents are compared with a partial pattern shown in FIG. 12-1206. If the similarity between the patterns exceeds a preset threshold, hypothesis information is generated.

FIG. 12 shows an occasion where hypothesis information is generated only from a partial pattern corresponding to FIG. 12-1209; and its pattern similarity Sim is voted to the hypothesis voting box.

A hypothesis space (FIG. 12-1211) for voting has a hypothesis voting box for each region where the existence of hypothesis information is assumed. In the initial state, no hypothesis voting box exists. When certain hypothesis information is generated, a hypothesis voting box is prepared for each position and name of the hypothesis information.

In FIG. 12-1211, five hypothesis voting boxes already exist. If hypothesis information having a different position and name is newly generated, a new hypothesis voting box will be prepared. If hypothesis information having the same position and name as already existing hypothesis voting box is generated, only integration of the similarity is carried out at the hypothesis voting box.

In the case of hypothesis information generated from FIG. 12-1209, a hypothesis voting box R3 having the same position and name already exists and therefore the similarity Sim (FIG. 12-1210) is integrated to the value of R3.

Such voting is sequentially carried out for all the combinations of feature points. Thus, the results of detection of the two objects are obtained from the voting results of FIG. 12-1211. FIG. 12-1212 shows the results and the positions and names of the two objects can be found.

In the hypothesis space (FIG. 12-1211) of the hypothesis information, with respect to R2 and R3, substantially the same object exists at the same position. The two hypothesis voting boxes are prepared in the process of sequentially generating hypothesis information. In such a case, processing to integrate the two hypothesis voting boxes or select one of them is carried out and one result may be outputted. If hypothesis information having the same position and different names exists, as in the case of R4 and R5, processing to select one of the hypotheses that has the higher voting value is carried out; and the selected hypothesis is used as the result.

(Modifications)

(1) Modification 1

In the foregoing embodiment, a box is used as a recognition object. However, the recognition object is not limited to this. The recognition method can be used for recognition of various objects such as a person's face or a vehicle. The recognition method can be modified to find multiple objects. Finding multiple objects can be realized by separately checking the results of the value in the number of obtained votes, for each of multiple objects having different spatial positions, at the hypothesis integration unit.

(2) Modification 2

The number of points used for a combination of feature points is not limited to three. The type and number of and the calculation method for invariants such as the ratio of length and the angle used for the hash function are not limited, either. For example, as an invariant for perspective transformation, a compound ratio calculated from a combination of five points or the like can be used.

For example, though two invariants are used in the above-described embodiment, only one invariant is used and a one-dimensional hash table may be used. Alternatively, a third invariant is employed and a three-dimensional hash table may be used.

All the index parameters used for the hash table need not be invariants. For example, in a circumstance where change in size of an object and change in direction thereof are limited, information of length and information of direction may be used as index parameters, thus enabling high-speed search.

(3) Modification 3

On registration to a hash table, duplicate registration near each registration place on the table may be carried out in consideration of an error.

Alternatively, registration may be unchanged while a place calculated by a hash function and its neighborhood may be searched in the recognition stage.

(4) Modification 4

In the foregoing embodiment, an intensity change pattern is used. The intensity change pattern may be changed to another pattern.

For example, an intensity change pattern on which Fourier transform or log-polar transform has been performed, or an edge image or another pattern may be used for comparing the similarity.

While the intensity change image is used in the foregoing embodiment, a color image can also be used. If a color image has RGB color representation, similar processing is performed on each of R, G and B plane. Alternatively, the RGB color representation may be transformed to another color representation so that a pattern of the latter color representation may be used.

Moreover, color information can be used in the case of comparison of similarity. For example, using color histogram which is proposed by M. Swain and D. Ballard, "Color indexing," Int. Journal of Computer vision, vol.22, pages 11–32, December 1991, the similarity may be calculated by the color histograms in a region.

(5) Modification 5

Various changes can also be considered with respect to high-speed processing.

For example, as in random Hough transformation, a technique of randomly selecting feature points and carrying out voting can be employed. In this case, it is also possible not only to randomly select feature points but also to randomly select hypothesis information to be generated.

(6) Modification 6

For high-speed processing, various constraints may be imposed on the length and angle of vectors constituting basis information.

For example, in the case of detecting a car traveling on a road, since it is not necessary to search for an orientation of the car that is rotated 180 degrees, search can be made efficient by limiting the search range and parameters.

Moreover, since generation of hypothesis information and voting and so on can be carried out in parallel, packaging with a plurality of calculation mechanisms (ex. parallel computer, grid environment and PC cluster) may be carried out.

(7) Modification 7

With respect to the feature point extraction unit 2, detection using a separability filter and detection of corner points are described in the embodiments. However, not only points but also other geometric objects such as lines, regions, circles and arcs may also be used. In this case, feature points corresponding to individual geometric objects may be prepared; and given to the feature point selection unit 3.

For example, the detection of a geometric object is used in such a manner that; detection of a sectional straight line is carried out; and the two points at its both ends are used as feature points, or the center point of the straight line is used as a feature point.

In this case, if plural types are selectable with respect to feature points, the types of the feature points may be used as keys for search. For example, in the case where a circular feature point (E) and a rectangular feature point (K) are detectable, when three points are selected in model registration, eight combinations of three points are generated. That is, (E,E,E) (E,E,K) (E,K,K) (E,K,E) (K,E,E) (K,K,E) (K,E,K) (K,K,K) are generated.

If three points are selected at the time of recognition using this information, model selection may be carried out according to whether the combination is the same or not. This enables not only high-speed model selection but also correct evaluation of what feature points exist on the neighboring region of a partial pattern. Therefore, the recognition accuracy is improved. Of course, the type and number of feature points are not limited.

(8) Modification 8

In the foregoing embodiment, at the table registration unit 7, multiple models in a list structure is provided for model data in the case where a collision has occurred. However, the data structure is not limited to this.

For example, a tree structure enables efficient search for multiple models having the same index parameter.

Moreover, it is also possible to improve efficiency in search by defining a certain order structure, for the models having the same index parameter.

(9) Modification 9

In the foregoing embodiment, only similarity with a correct pattern was used. Incorrect recognition is alleviated by using incorrect pattern in the case of matching. As concrete example, there is the method of subtracting the similarity degree of incorrect pattern, from vote space.

It is to be noted that various modifications and changes may be made without departing from the scope of the present invention.

The present invention provides a new system for detecting a recognition object based on local image information and an efficient registration method. Reduction in calculation cost can be realized in comparison with the conventional appearance-based approaches.

Moreover, high-speed detection of similarity is made possible and the detection accuracy improves.

Furthermore, this technique uses partial information and therefore is robust against occlusion. Since efficient model search using a hash table is carried out, application to high-speed search is made possible.

CROSS-REFERENCE TO RELATED APPLICATIONS

This application is based upon and claims the benefits of priority from the prior Japanese Patent Applications No. 2001-380676 filed on Dec. 13, 2001; the contents of which are incorporated herein by reference.

What is claimed is:

1. A pattern recognition apparatus for comparing an image which captured a recognition object, with a pre-registered model; and thus recognizing said recognition object, the apparatus comprising:

image input means for inputting an image which captured said recognition object;

feature point extraction means for extracting multiple feature points from said inputted image;

feature point selection means for selecting a combination of multiple feature points from said extracted feature points;

basis calculation means for calculating, from said multiple selected feature points, bases which represent the positions and positional relations of these feature points;

partial pattern extraction means for extracting from said image a partial pattern of said recognition object corresponding to each of said calculated bases;

table storage means for storing a table which includes a plurality of registration places as divided based on index parameters including at least a parameter invariant to geometric transformation derived from the calculated bases, and on which a partial pattern of said model is registered in one of the table registration places corresponding to an index parameter related to the partial pattern and derived from the calculated bases;

index search means for deciding a registration place on the stored table, based on an index parameter corresponding to the partial pattern extracted by said partial pattern extraction means; and pattern similarity calculation means for judging the similarity between the partial pattern of said model registered in said decided registration place on the table and the partial pattern extracted by said partial pattern extraction means, wherein the calculated bases are an angle between two basis vectors and a ratio between lengths of the two basis vectors.

2. The pattern recognition apparatus as claimed in claim 1, comprising:

image input means for inputting an image of a model to be registered to said table;

feature point extraction means for extracting multiple feature points from said inputted image;

feature point selection means for selecting a combination of plural feature points from said extracted feature points;

basis calculation means for calculating bases representing the positions of and positional relations between said selected feature points;

partial pattern extraction means for extracting, from said image, partial patterns of the model corresponding to said calculated bases;

index decision means for deciding registration places on said table using index parameters corresponding to the partial patterns of said model as indexes; and table registration means for registering the partial patterns of said model to said decided registration places on the table.

3. The pattern recognition apparatus as claimed in claim 2, wherein said table registration means can merge multiple models having the same characteristics.

4. The pattern recognition apparatus as claimed in claim 1, further comprising:

hypothesis information generation means for generating hypothesis information showing which position in the image said recognition object exists based on the similarity calculated by the pattern similarity calculation means, and voting the generated hypothesis information in each hypothesis space; and object recognition means for deciding the identification, position, and orientation of said recognition object based on the number of votes obtained for the hypothesis information in said each hypothesis space.

5. The pattern recognition apparatus as claim in claim 4, wherein said hypothesis information generation means uses, as hypothesis information, the similarity belonging to each feature point corresponding to said model registered in a search place on said table, and votes in each hypothesis voting box provided for said each feature point in said hypothesis space, thereby finding the number of votes for said each feature point, and said object recognition means assumes a feature point having the number of votes in said hypothesis voting box that exceeds a threshold, as a feature point corresponding to said recognition object.

6. The pattern recognition apparatus as claimed in claim 4, wherein said hypothesis information generation means uses, as hypothesis information, information including the similarity belonging to a position of existence in a search place on said table, and votes in each hypothesis voting box provided for said position of existence in said hypothesis space, thereby finding the number of votes for said position of existence, and said object recognition means assumes a position of existence having the number of votes in said hypothesis voting box that exceeds a threshold, as a position of existence corresponding to said recognition object.

7. The pattern recognition apparatus as claimed in claim 4, wherein said hypothesis information generation means uses, as hypothesis information, information including the similarity belonging to each type of said recognition object in a search place on said table, the similarity being calculated by the pattern similarity calculation means, and votes in each hypothesis voting box provided for said each type of said recognition object in said hypothesis space, thereby finding the number of votes for said each type of said recognition object, and said object recognition means assumes a type having the number of votes in said hypothesis voting box that exceeds a threshold, as a type corresponding to said recognition object.

8. The pattern recognition apparatus as claimed in claim 1, wherein the table is a table calculated by a hash function.

9. The pattern recognition apparatus as claimed in claim 1, wherein the partial pattern is an intensity change image within a predetermined range about an origin of the calculated bases.

10. A pattern recognition method for comparing an image which captured a recognition object with a pre-registered model and thus recognizing said recognition object, the method comprising:

inputting an image which captured said recognition object;

extracting multiple feature points from said inputted image;

selecting a combination of multiple feature points from said extracted feature points;

calculating bases which represent the positions and positional relations of these feature points;

extracting from said image a partial pattern of said recognition object corresponding to each of said calculated bases;

storing a table which includes a plurality of registration places as divided based on index parameters including at least a parameter invariant to geometric transformation derived from the calculated bases, and on which a partial pattern of said model is registered in one of the table registration places corresponding to an index parameter related to the partial pattern and derived from the calculated bases;

deciding a registration place on the said stored table, based on an index parameter corresponding to the partial pattern extracted by said partial pattern extracting; and judging the similarity between the partial pattern of said model registered in said decided registration place on the table and the partial pattern extracted by said partial pattern extracting, wherein the calculated bases are an angle between two basis vectors and a ratio between lengths of the two basis vectors.

11. A computer readable medium including a programmed product for realizing, by a computer, a pattern recognition method for comparing an image which captured a recognition object with a pre-registered model and thus recognizing said recognition object, the program realizing:

an image input function for inputting an image which captured said recognition object;

a feature point extraction function for extracting multiple feature points from said inputted image;

a feature point selection function for selecting a combination of multiple feature points from said extracted feature points;

a basis calculation function for calculating bases which represent the positions and positional relations of these feature points from said multiple selected feature points;

a partial pattern extraction function for extracting from said image a partial pattern of said recognition object corresponding to each of said calculated bases;

a table storage function for storing a table which includes a plurality of registration places as divided based on index parameters including at least a parameter invariant to geometric transformation derived from the calculated bases, and on which a partial pattern of said model is registered in one of the table registration places corresponding to an index parameter related to the partial pattern and derived from the calculated bases;

an index search function for deciding a registration place on the said stored table, based on an index parameter corresponding to the partial pattern extracted by said partial pattern extraction function; and a pattern similarity calculation function for judging the similarity between the partial pattern of said model registered in said decided registration place on the table and the partial pattern extracted by said partial pattern extraction functions, wherein the calculated bases are an angle between two basis vectors and a ratio between lengths of the two basis vectors.

* * * * *